United States Patent Office 3,434,288
Patented Mar. 25, 1969

3,434,288
BY-PASS GAS TURBINE ENGINE
James Alexander Petrie, Littleover, Derby, England, assignor to Rolls-Royce Limited, Derby, England, a British Company
Filed Feb. 27, 1967, Ser. No. 618,850
Claims priority, application Great Britain, Mar. 9, 1966, 10,462
Int. Cl. F02k *1/00, 3/04;* F04d *19/00*
U.S. Cl. 60—226
11 Claims

ABSTRACT OF THE DISCLOSURE

A by-pass gas turbine engine has coaxial shafts, which carry the compressors and turbines, mounted within two adjacent thrust bearings which are supported from the engine casing by a common support structure.

---

This invention concerns a by-pass gas turbine engine.

The term "by-pass engine" is used in this specification in a broad sense as including front fan and other gas turbine engines in which a part of the air passing through the engine as a whole does not pass through the combustion equipment thereof.

According to the present invention, there is provided a by-pass gas turbine engine comprising a casing, outer and inner shafts rotatably mounted within said casing, compressor means and turbine means carried on said shafts, two adjacent thrust bearings within which are respectively mounted said shafts, a common support structure, the two adjacent thrust bearings being supported from the said casing by the said common support structure, a further shaft mounted within said inner shaft and a further thrust bearing within which the further shaft is mounted and supported by said inner shaft.

Said outer and inner shafts may be coaxially mounted. Thus the outer and inner shafts may carry high pressure and intermediate pressure compressors.

The inner shaft may also carry an intermediate pressure compressor.

The thrust bearing of the outer shaft may be mounted adjacent the upstream end thereof. In this case, the inner shaft and the downstream end of the outer shaft may be mounted in adjacent bearings which are supported from the said casing by common support structure.

The inner shaft may also be mounted in a bearing which is disposed upstream of the said thrust bearings and which is located adjacent the low pressure compressor.

A front fan may be carried by said further shaft.

Preferably said further shaft carries a low pressure turbine of the engine. Preferably the thrust bearing within which the further shaft is mounted and supported by said inner shaft is disposed adjacent the said two adjacent thrust bearings.

Thrust reverser or spoiler members may be provided for reversing or spoiling the thrusts of the fan air and of the turbine exhaust gases.

Figure 1A:
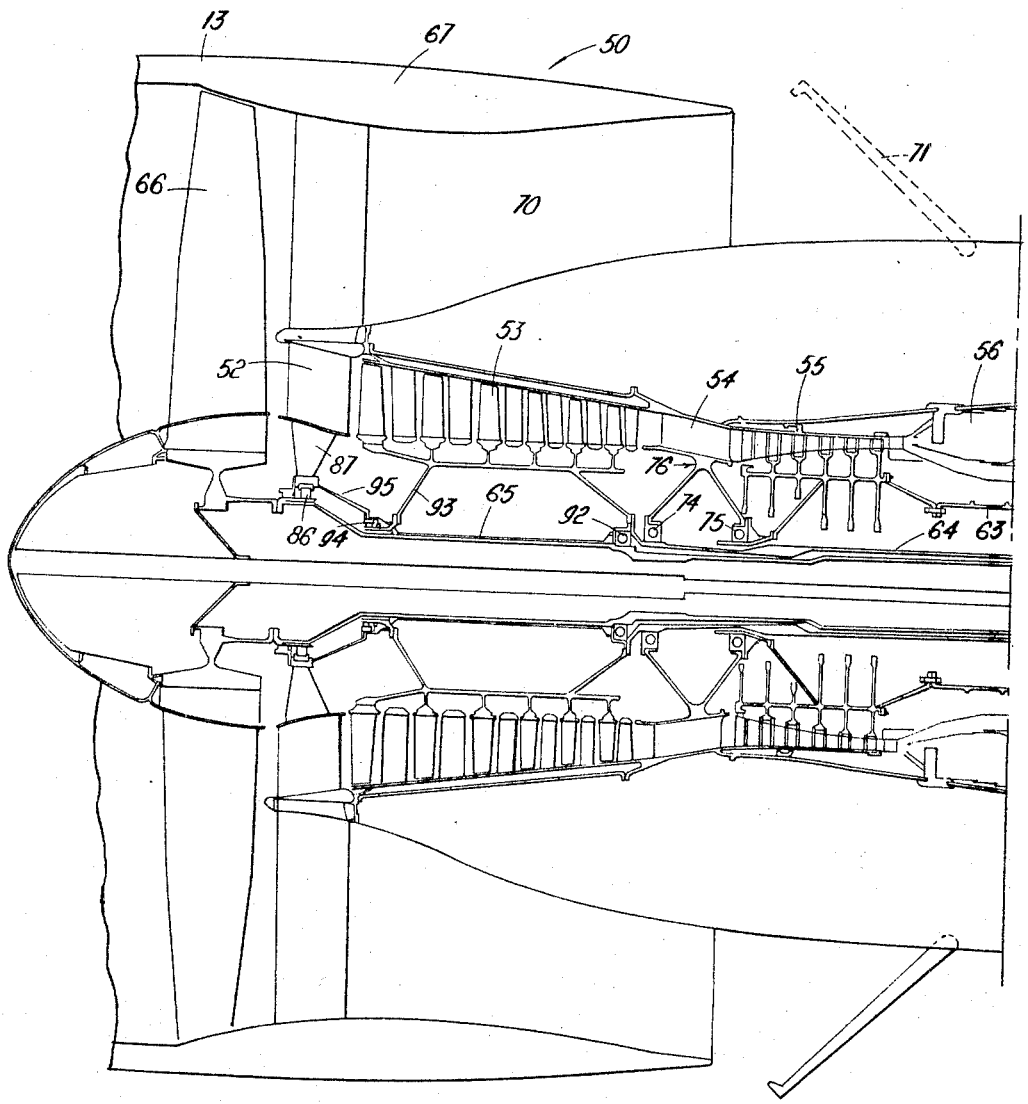
Figure 1B:
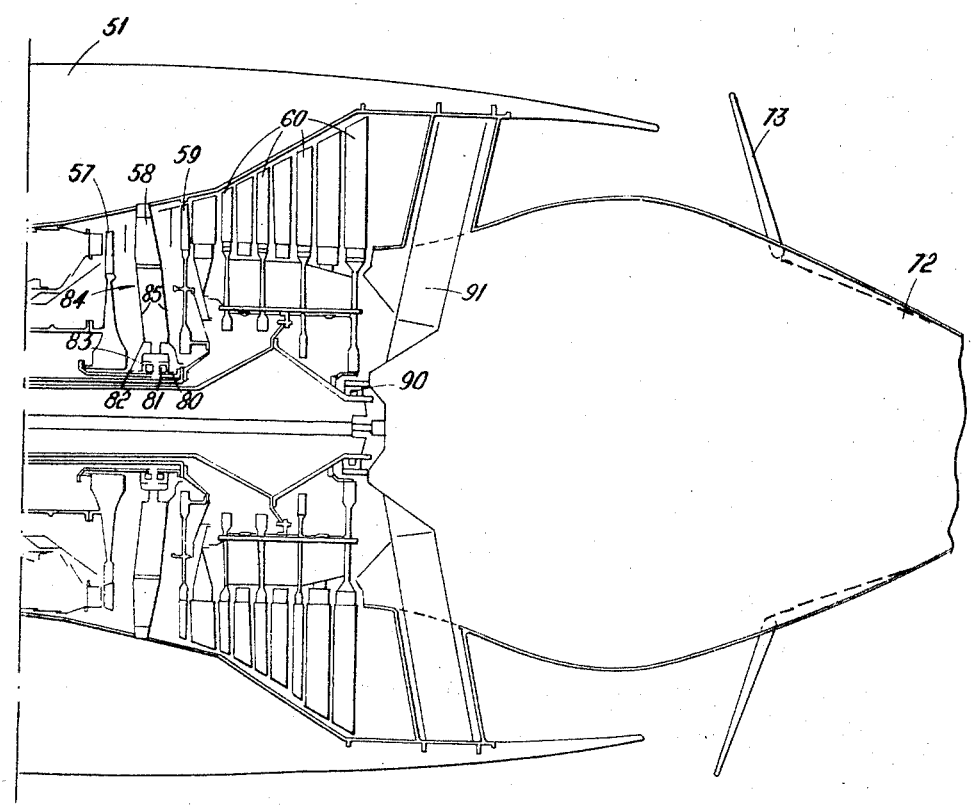

The invention is illustrated, merely by way of example, in the accompanying drawings in which:

FIGURES 1a and 1b are diagrammatic sectional views illustrating respectively the front and rear portion of a gas turbine engine according to the present invention.

Referring to the drawings, a gas turbine front fan engine 50 has a casing 51 within which there are mounted, in flow series, compressor inlet guide vanes 52, an intermediate pressure compressor 53, outlet guide vanes 54, a high pressure compressor 55, combustion equipment 56, a high pressure turbine 57, a plurality of angularly spaced apart nozzle guide vanes 58, an intermediate pressure turbine 59, and a low pressure turbine 60.

The high pressure turbine 57 and the high pressure compressor 55 are mounted on a common shaft 63. Mounted concentrically within the shaft 63 is a shaft 64 which carries the intermediate pressure turbine 59 and the intermediate pressure compressor 53.

Mounted concentrically within the shaft 64 is a shaft 65 on which are mounted the low pressure turbine 60 and a front ducted fan 66, the fan 66 being mounted within a casing 67. The casing 67 is mounted about the casing 51 and at the upstream end thereof so as to define therewith an annular duct 70 through which flows a stream of air which has been accelerated by the fan 66, the said stream of air by-passing the compressors 53, 55 and the turbines 57, 59, 60.

Mounted on the casing 51 are a plurality of angularly spaced apart thrust reverser or spoiler members 71 which are movable (by means not shown) into and out of a position in which they effect reversal or spoiling of the thrust produced by the fan air.

The engine 50 has at its downstream end a bullet member 72 on which are pivotally mounted a plurality of angularly spaced apart thrust reverser or spoiler members 73 which are movable (by means not shown) into and out of a position in which they effect reversal or spoiling of the thrust of the turbine exhaust gases.

The shaft 64 is mounted within a thrust bearing 74, while the upstream end of the shaft 63 is mounted within a thrust bearing 75 which is disposed adjacent to the thrust bearing 74. The thrust bearings 74, 75 are supported by common support structure 76 from the guide vanes 54.

The shaft 64 is provided adjacent its downstream end with a skirt portion 80 which is mounted within a roller bearing 81. The shaft 63 has a portion 82 which is disposed immediately downstream of the high pressure turbine 57 and which is mounted within a roller bearing 83, the roller bearings 81, 83 being disposed adjacent to each other. The roller bearings 81, 83, moreover, are supported from the casing 51 by common support structure 84. The common support structure 84 comprises two radially extending axially spaced apart annular members 85 which are welded to the nozzle guide vanes 58.

The shaft 65 is mounted adjacent its upstream end in a roller bearing 86 which is supported by structure 87 connected to the guide vanes 52. The downstream end of the shaft 65 is, moreover, mounted in a roller bearing 90, the bearing 90 being supported from the casing 51 by means of struts 91.

The shaft 65 is also mounted within a thrust bearing 92 which is supported by the shaft 64 and which is disposed adjacent to the thrust bearings 74, 75.

The shaft 64 has a forward portion 93 which is mounted within a bearing 94, the bearing 94 being supported from the structure 87 by way of a wall 95.

I claim:
1. A by-pass gas turbine engine comprising a casing, outer and inner shafts rotatably mounted within said casing, compressor means and turbine means carried on said shafts, two adjacent thrust bearings within which are respectively mounted said shafts, a common support structure, the two adjacent thrust bearings being supported from the said casing by the said common support structure, a further shaft mounted within said inner shaft and a further thrust bearing within which the further shaft is mounted and supported by said inner shaft.

2. A by-pass gas turbine engine as claimed in claim 1 in which said inner and outer shafts are coaxially mounted.

3. A by-pass gas turbine engine as claimed in claim 1 in which a front fan is carried by said further shaft.

4. A by-pass gas turbine engine as claimed in claim 1 in which the thrust bearing within which the further shaft is mounted and supported by said inner shaft is disposed adjacent the said two adjacent thrust bearings.

5. A by-pass gas turbine engine as claimed in claim 1 in which the outer and inner shafts respectively carry high pressure and intermediate pressure compressors.

6. A by-pass gas turbine engine as claimed in claim 5 in which the inner shaft also carries an intermediate pressure compressor.

7. A by-pass gas turbine engine as claimed in claim 1 in which the thrust bearing of the outer shaft is mounted adjacent the upstream end thereof.

8. A by-pass gas turbine engine as claimed in claim 7 in which the inner shaft and the downstream end of the outer shaft are mounted in adjacent bearings which are supported from the said casing by common support structure.

9. A by-pass gas turbine engine as claimed in claim 1 in which a bearing is provided, the inner shaft being mounted in said bearing which is disposed upstream of the said thrust bearings and which is located adjacent the low pressure compressor.

10. A by-pass gas turbine engine as claimed in claim 3 in which said further shaft carries a low pressure turbine of the engine.

11. A by-pass gas turbine engine as claimed in claim 3 in which thrust reverser members are provided for reversing the thrusts of the fan air and of the turbine exhaust gases.

References Cited

UNITED STATES PATENTS

| | | | |
|---|---|---|---|
| 2,575,682 | 11/1951 | Price | 230—123 |
| 2,803,943 | 8/1957 | Rainbow | 60—39.16 |
| 3,273,340 | 9/1966 | Hull | 60—39.16 |
| 3,279,182 | 10/1966 | Helmintoller | 60—226 |
| 3,280,561 | 10/1966 | Kutney | 60—226 |
| 3,313,105 | 4/1967 | Johnson | 60—39.16 |

FOREIGN PATENTS 980,368  1/1965  Great Britain.

CARLTON R. CROYLE, Primary Examiner.

DOUGLAS HART, Assistant Examiner.

U.S. Cl. X.R.

60—230, 39.16; 230—122